United States Patent [19]

Kagechika

[11] Patent Number: 4,459,003
[45] Date of Patent: Jul. 10, 1984

[54] ZONE-TYPE RANGE-DETECTING DEVICES FOR CAMERAS

[75] Inventor: Takashi Kagechika, Saitama, Japan

[73] Assignee: Fuji Photo Optical Co., Ltd., Saitama, Japan

[21] Appl. No.: 414,404

[22] Filed: Sep. 2, 1982

[30] Foreign Application Priority Data

Sep. 4, 1981 [JP] Japan .............................. 56-139543

[51] Int. Cl.³ .............................................. G03B 3/00
[52] U.S. Cl. .................................................. 354/402
[58] Field of Search .................................... 354/25, 402

[56] References Cited

U.S. PATENT DOCUMENTS 3,945,023 3/1976 Stauffer ................................. 354/25
4,182,555 1/1980 Imura et al. ........................... 354/25
4,339,185 7/1982 Nakauchi et al. ................. 354/25 X Primary Examiner—Michael L. Gellner
Attorney, Agent, or Firm—Young & Thompson

[57] ABSTRACT

A zone-type range-detecting device for a camera, detects in which one of a plurality of zones an object to be photographed is located, these zones being spaced from the camera different distances along an axis which can be the optical axis of the picture-taking lens of the camera, or another axis. In one embodiment, a light-sensing device located on that axis senses the luminosity of all objects located on that axis regardless of the zone in which the object is located, and a plurality of individual light-sensing devices is also provided, each of which senses the luminosity of an object within only a respective one of those zones. A plurality of differential amplifiers calculates the differences between the outputs from the common light-sensing device and each one of the plurality of individual light-sensing devices, and the minimum output among the outputs from the plurality of differential amplifiers is detected, thereby to locate the zone in which the object to be photographed is located. In another embodiment, there is no common light-sensing device, but rather a plurality of pairs of light-sensing devices, each directed toward an individual one of those zones. In this case, the light-sensing devices are preferably arranged in pairs on diametrically opposite sides of the picture-taking lens of the camera, with the various light-sensing devices thus forming a circular series about the picture-taking lens.

7 Claims, 8 Drawing Figures

ZONE-TYPE RANGE-DETECTING DEVICES FOR CAMERAS

BACKGROUND OF THE INVENTION

This invention relates to zone-type range-detecting devices used for automatically adjusting the focus of cameras.

As is well known, there are many kinds of range-detecting devices for detecting a zone in which an object to be photographed is located, such as the extreme value detection type, the coincidence type, or the gravity influenced pendulum type. The respective types of range-detecting device are further divided into two categories, in one of which it is necessary to provide mechanical, optical or electric scanning means and in the other of which it is not necessary to have any scanning means.

Cameras with a range-detecting device without any incorporated scanning means are not only advantageous in design but also easy to operate. Moreover, an increase in the number of range-detecting means is unavoidable as the number of zones in response to which a camera's picture-taking lens is adjusted increases.

Such an increased number of range-detecting means is economically disadvantageous and provides unsatisfactory accuracy. A zone-type range-detecting device which has been proposed to eliminate the above-mentioned disadvantages is described in U.S. Pat. No. 3,945,023. In that patent, a zone-type range-detecting device is provided with a first array of light-sensing elements for receiving light from an object along a first optical light path and a second array of light-sensing elements for receiving light from the object along a second optical light path, and the disagreement between intensity distributions of light on the first and second means is detected so as to find the zone within which the object to be photographed is located. However, in such a range-detecting device, there are the disadvantages that, since an increased number of circuit elements is required in order to detect the degree of disagreement between the intensity distribution of light on the first and second means, the range-detecting devices become complicated in construction, and detection failure can result from patterns of the image of the object on the first and second means.

OBJECTS OF THE INVENTION

It is therefore an object of the present invention to provide a zone-type range-detecting device with a simple structure.

Another object of the present invention is to provide a zone-type range-detecting device capable of measurement with a high accuracy.

Still another object of the present invention is to provide a zone-type range-detecting device wherein there is no parallax between the camera's picture-taking lens and the light-receiving means.

It is a further object of the present invention to provide a zone-type range-detecting device capable of range detecting accurately as to the zone wherein is located an object illuminated by flickering light from, for instance, a fluorescent lamp.

SUMMARY OF THE INVENTION

The above-mentioned objects of the present invention are achieved by the provision of a plurality of pairs of light-sensing means each pair of which is positioned so as to sense the luminosity of an object at two different positions and to then calculate the difference between the outputs from the respective light-sensing means. By detecting the minimum difference among the differences, the zone is detected wherein an object to be photographed is located. Said plurality of pairs of light-sensing means may comprise a common light-sensing element and an individual light-sensing element in combination.

BRIEF DESCRIPTION OF THE DRAWINGS

Other objects, features and advantages of the invention will become apparent from the following description of the illustrated embodiment when read in connection with the accompanying drawings, wherein.

DETAILED DESCRIPTION OF THE INVENTION

Figure 1:
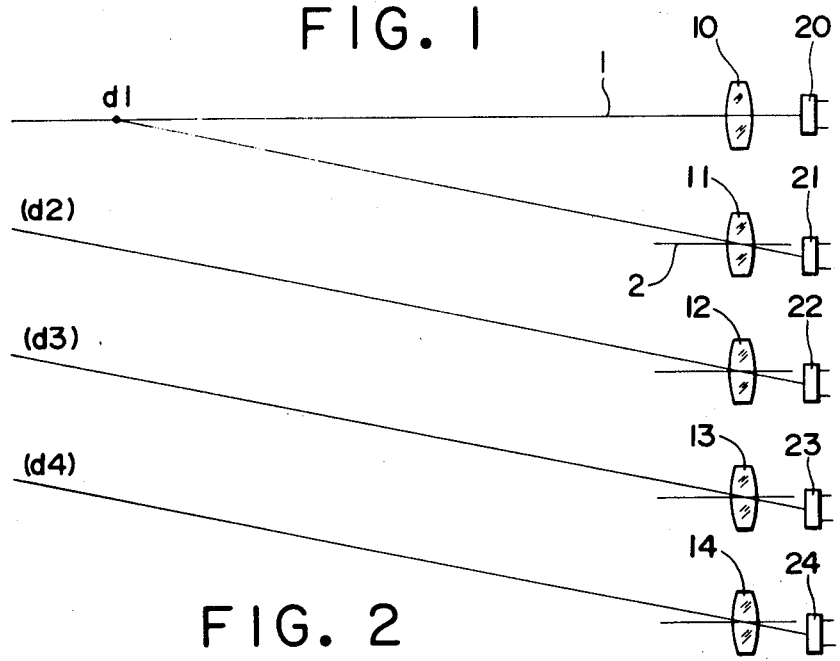
FIG. 1 is a schematic diagram showing the fundamental principle of the structure of the zone-type range-detecting device of this invention.
Figure 3:
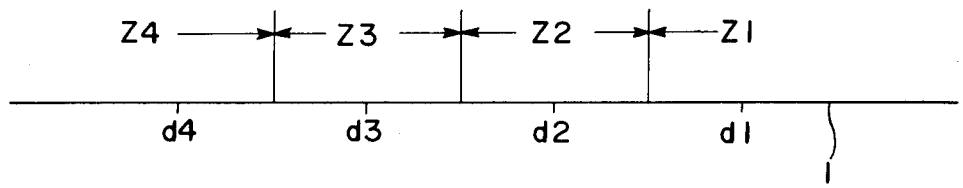
FIG. 3 is a diagram showing the different zones in the field of view of the light-sensing means.

Referring now to FIGS. 1 and 3 of the drawings, the fundamental arrangement of the zone-type range-detecting device according to the present invention is shown, in which the object field is divided into, for instance, four zones Z1, Z2, Z3 and Z4 the center points of these zones are designated d1, d2, d3 and d4, respectively. However, the number of zones is in no way critical to the function of the zone-type range-detecting devices to be disclosed later.

The zone-type range-detecting device is provided with a common light-sensing means 10–20 and four individual light-sensing means 11–21, 12–22, 13–23 and 14–24, each comprising a set of an image-forming lens 10–14 and a light-sensing element 20–24 on which an object is focused by the image-forming lens. These light-sensing means are arranged fixed in a row that is perpendicular to the principal optical axis 1 of the image-forming lens 10 of the common light-sensing means. As used in this specification, the term "principal optical axis" is used to refer to the optical axis which is substantially coincident or parallel with the optical axis of the picture-taking lens of the camera. The lens 10 is so designed as to focus objects located on the principal axis 1 at positions d1, d2, d3 and d4, on the center of the light-sensing element 20. The lenses 11 to 14 are so designed as to form the images of objects at positions d1, d2, d3 and d4 on the centers of the individual light-sensing elements 21 to 24, respectively. Therefore, an object at position d1 is focused by the lenses 10 and 11 on the light-sensing elements 20 and 21, respectively, at the centers thereof, while, by the other lenses 12 to 14, it is focused on the individual light-sensing elements 22 to 24, respectively, at a short distance from the center of each. When an object is at position d2, it is focused by the lenses 10 and 12 on the light-sensing elements 20 and 22, respectively. It is apparent that objects at positions d3 and d4 are imaged in the same manner as described for positions d1 and d2. The number of light-sensing means is not limited to that specified in this embodiment but determined by the number of zones into which the object field is to be divided. Since the distances d1, d2, d3 and d4 assigned to the center points of zones Z1, Z2, Z3 and Z4, respectively, are quite far from the range-detecting device as compared with the distances between the light-sensing means themselves, the field of view of the respective image-forming lenses can cover the entire range of the object field; while the points at positions d1, d2, d3 and d4 are focused on the individual light-sensing elements at their respective centers. Therefore, the points at, for instance, d1 position will be focused on the light-sensing elements 20 and 21 at their centers, but eccentrically on the other light-sensing elements 22 to 24.

Figure 2:
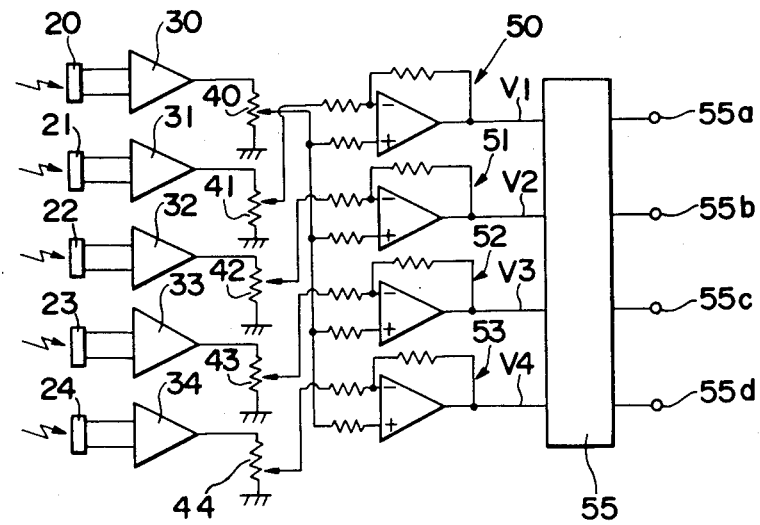
FIG. 2 is a diagram showing the signal processing circuit.

FIG. 2 shows an embodiment of a signal-processing circuit, in which the outputs representing the luminosity of the object to be photographed, from the light-sensing elements 20 to 24, are amplified by pre-amplifiers 30 to 34, respectively. The output from the pre-amplifier 30 is, after reduction to a determined level of voltage by a variable resistor 40, transmitted as reference voltage to differential amplifiers 50 to 53, respectively. Simultaneously, the outputs from the pre-amplifiers 31 to 34 are, after reduction to the same level of voltage as that by the variable resistor 40, by variable resistors 41 to 44, respectively, transmitted to input terminals of the respective differential amplifiers 50 to 53. Each output from the differential amplifiers 50 to 53 is transmitted to a conventional minimum value detecting circuit 55 in order to distinguish which output is the smallest. The conventional minimum value detecting circuit 55, as is well known, includes a minimum value sampling circuit comprising a group of diodes which are each connected to a respective one of the differential amplifiers 50 to 53 and to a group of comparators (not shown) serving to compare the minimum value sampled by each of the outputs from the differential amplifiers 50 to 53, said comparators being connected to the respective output terminals 55a to 55d of the minimum value detecting circuit.

Assuming first that an object to be photographed is at position d1 on the principal optical axis 1, the images of the object formed on the light-sensing elements 20 and 21 are substantially coincident in pattern and position, with the result that the outputs from the light-sensing elements 20 and 21 representing the luminosity of the object are substantially identical. However, the outputs from the remaining light-sensing elements 22 to 24 are different from the output from the light-sensing element 21 because of disagreement in pattern and position between the images on the light-sensing element 20 and any of the remaining elements 22 to 24.

Owing to the fact that the output from the pre-amplifier 30 is fed as a reference voltage to every differential amplifier 50 to 53, the differential amplifier 50 has the smallest output V1 of the four (in fact, when the images are completely coincident, the output will read zero voltage). In this case, the minimum value detecting circuit 55 is at its "H" (high) level of output at the output terminal 55a, which means that an object to be photographed is within Zone 1.

If an object to be photographed is at position d2, the images on the light-sensing elements 20 and 22 are substantially coincident, leading to an almost exact agreement in outputs generated thereby, while the outputs from the others are different. This causes the differential amplifier 51 to provide the minimum output V2, causing the minimum value detecting circuit 55 to be at "H" level at its output terminal 55b. Thus the state of the output terminal at "H" level indicates that the object to be photographed is within Zone 2. In this way, by detecting the minimum outputs V1 to V4 from the differential amplifiers 50 to 53, the zone wherein the object to be photographed is distinguished from among zones Z1, Z2, Z3 and Z4. In practice, the camera's lens-adjusting operation will take place by conventional mechanism operated according to the outputs from the terminals of the minimum value detecting circuit.

Figure 4:
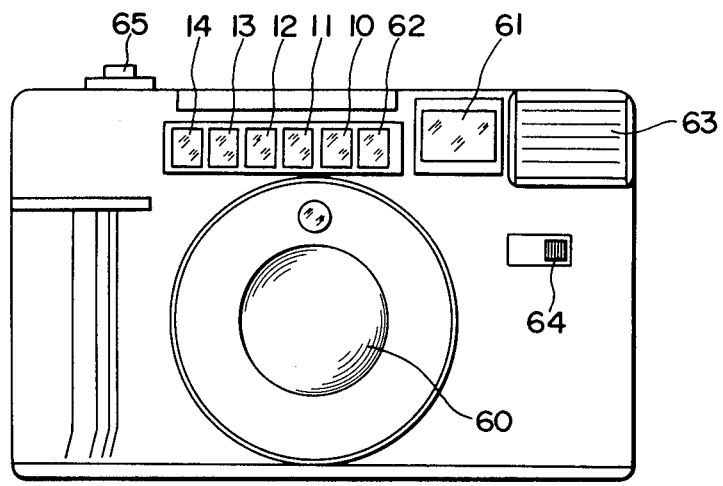
FIG. 4 is a front view of a camera having the zone-type range-detecting device of this invention.

Referring now to FIG. 4, which is a front view showing a pocket-size camera incorporating the zone-type range-detecting device described above, the light-sensing device having the lenses 10 to 14 arranged in a row with suitable spacing is disposed over the picture-taking lens 60 and beside the finder window 61. Adjacent the rightmost lens 10, an infrared-light-emitting means 62 is provided so as to illuminate the object to be photographed when ambient light is insufficient to detect the luminosity of the object. The infrared-light-emitting means is so designed as to be operated by a main switch 64 for energizing a flash means 63. It should be understood that the infrared-light-emitting means 62 may alternatively be actuated by shutter-actuating member 65 whenever the latter is operated.

Figure 5:
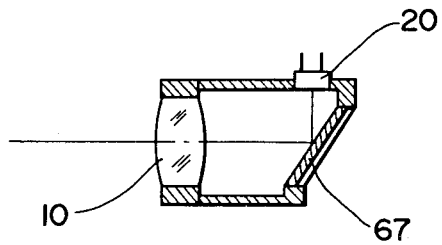
FIG. 5 is a sectional view showing an embodiment of a light-sensing means.

FIG. 5 shows an embodiment of the light-sensing means, especially the common light-using means, wherein light passing through the lens 10 is reflected by a mirror 67 to impinge upon the light-sensing element 20. In this embodiment, because the optical path is bent, the light-sensing means is small in overall length or size.

Figure 6:
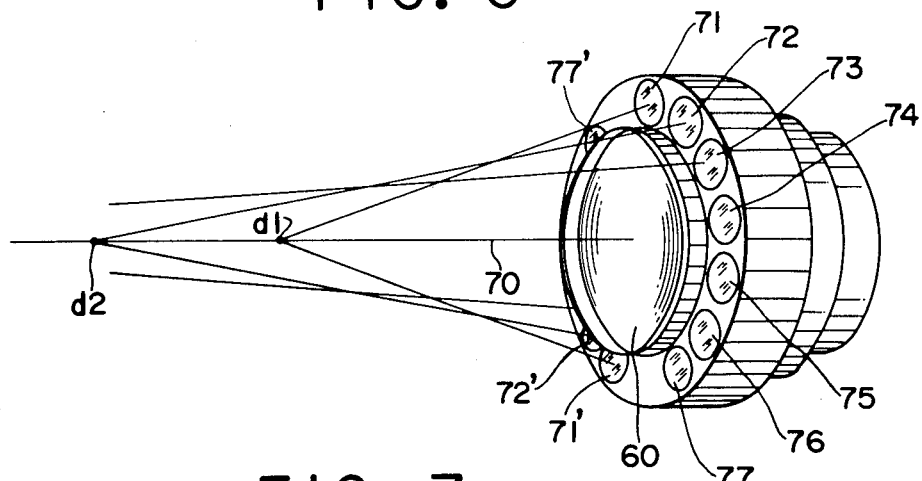
FIG. 6 is a perspective view showing another embodiment of the invention wherein a plurality of pairs of light-sensing means are arranged around a camera's picture-taking lens.
Figure 7:
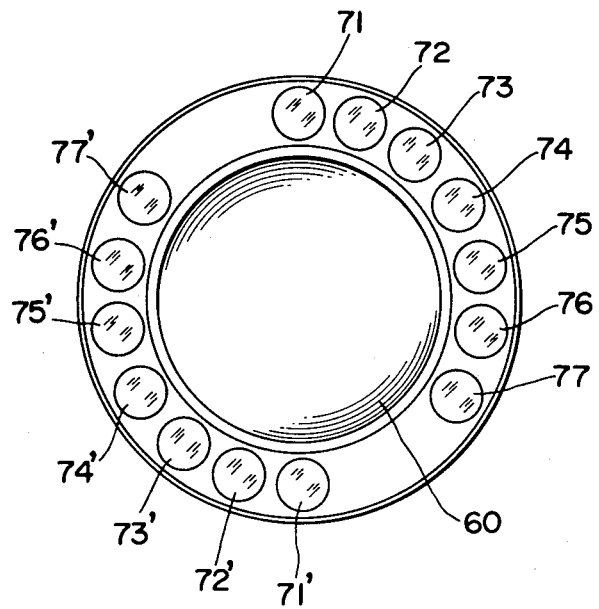
FIG. 7 is a front view of the embodiment shown in FIG. 6.

FIGS. 6 and 7 show another embodiment having a light-sensing device arranged around a camera's picture-taking lens 60, wherein a plurality of pairs of light-sensing means are provided one for every zone. A pair of light-sensing means 71 and 71' is oppositely disposed diametrically of the picture-taking lens 60 so that it provides an output voltage of substantially zero when the object to be photographed is at position d1 on the optical axis 70 of the picture-taking lens 60. A pair of light-sensing means 72 and 72' is oppositely disposed so as to provide an output voltage of substantially zero when detecting an object to be photographed at position 62. In the same manner as described for light-sensing means 71, 71' and 72, 72', the remaining light-sensing means 73, 73' through 77, 77' are so arranged so to provide an output voltage of substantially zero when detecting an object at positions d3, d4 . . . and d7, respectively.

Figure 8:
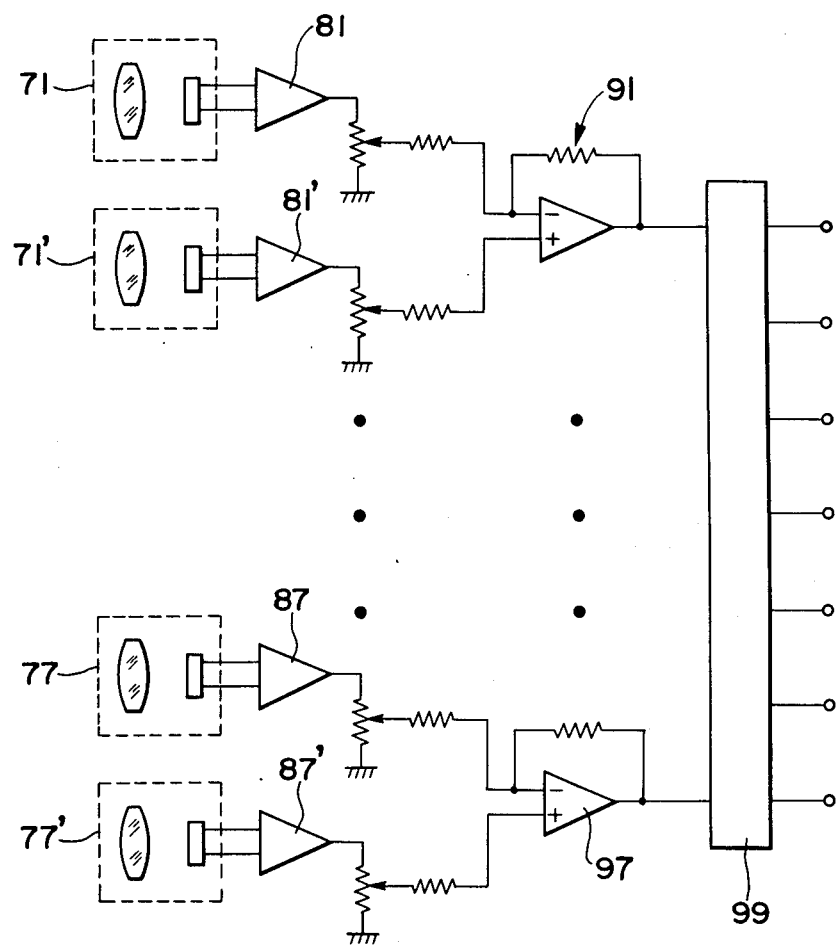
FIG. 8 is a circuit diagram showing a signal processing circuit used with the embodiment shown in FIG. 6.

In the signal-processing circuit shown in FIG. 8, the difference between the output from the light-sensing means 71 and 71' is calculated by a differential amplifier 91, after amplification through pre-amplifiers 81 and 81', respectively. On the other hand, the difference between the outputs from the light-sensing means 77 and 77' is calculated by a differential amplifier 97, after amplification through pre-amplifiers 87 and 87', respectively. Although the light-sensing means 72, 72' through 76, 76' and the circuit elements associated therewith are omitted for the purpose of simplification, the differences between the members of each pair of light-sensing means are calculated in the same way as described for the light-sensing means 71, 71' and 77, 77'. The differences calculated by the respective differential amplifiers are compared to one another by a minimum value detecting circuit 99 in order to distinguish which is the smallest. By detecting the pair of light-sensing means from which the minimum difference is produced, the zone is detected within which is located the object to be photographed. The arrangement of the light-sensing means around the picture-taking lens can allow an increased number of zones into which the object-field is divided, while making sure there is no parallax in the zone-type range-detecting device. Furthermore, cameras provided with the zone-type range-detecting device according to the invention can be designed to be compact.

Although certain specific embodiments of the present invention have been shown and described, many modifications thereof are possible. Therefore, the invention is not to be limited to the specific details shown and described, but is intended to cover all modifications coming within the scope of the appended claims.

What is claimed is:

1. A zone-type range-detecting device for a camera, for detecting in which one of a plurality of zones an object to be photographed is located, said zones being spaced from the camera different distances along an axis, comprising:
    a common light-sensing means for sensing the luminosity of an object located on said axis;
    a plurality of individual light-sensing means each of which senses the luminosity of an object within only a respective one of said zones;
    each of said light-sensing means comprising an image-forming lens system and a light-sensing element having an optical axis that intersects the first-mentioned axis each in a different one of said zones;
    a plurality of differential amplifiers for calculating the differences between the outputs from said common light-sensing means and each one of said plurality of individual light-sensing means; and
    means for detecting a minimum output among the outputs from said plurality of differential amplifiers.

2. A zone-type range-detecting device as defined in claim 1, wherein said first-mentioned axis is the optical axis of a picture-taking lens of the camera with which the zone-type range-detecting device is incorporated.

3. A zone-type range-detecting device as defined in claim 2, wherein all of said common and individual light-sensing means are arranged in a straight line above the camera's picture-taking lens.

4. A zone-type range-detecting device for a camera for detecting in which one of a plurality of zones an object to be photographed is located, said zones being spaced from the camera different distances along an axis, comprising:
    a plurality of pairs of light-sensing means each of which pairs senses the luminosity of an object within a respective one of said zones;
    each said light-sensing means having an optical axis that intersects the first-mentioned axis;
    the optical axes of each said pair of light-sensing means meeting at said first-mentioned axis in a different one of said zones;
    a plurality of differential amplifiers each of which calculates the difference between the outputs from a respective one of each pair of light-sensing means; and
    means for detecting a minimum output among the outputs from said plurality of differential amplifiers.

5. A zone-type range-detecting device as defined in claim 4, wherein each of said light-sensing means comprises an image-forming lens system and a light-sensing element.

6. A zone-type range-detecting device as defined in claim 5, wherein all of said light-sensing means are arranged around the picture-taking lens of the camera with which the zone-type range-detecting device is incorporated.

7. A zone-type range-detecting device as defined in claim 6, the members of each said pair of light-sensing means being oppositely disposed diametrically of said camera's picture-taking lens.

* * * * *